Sept. 4, 1956
A. E. W. JOHNSON
2,761,268
HARVESTER TOWING TRACTOR HAVING POWER-OPERATED
TRACTION WHEEL LIFTING PROP
Filed March 10, 1954
2 Sheets-Sheet 2
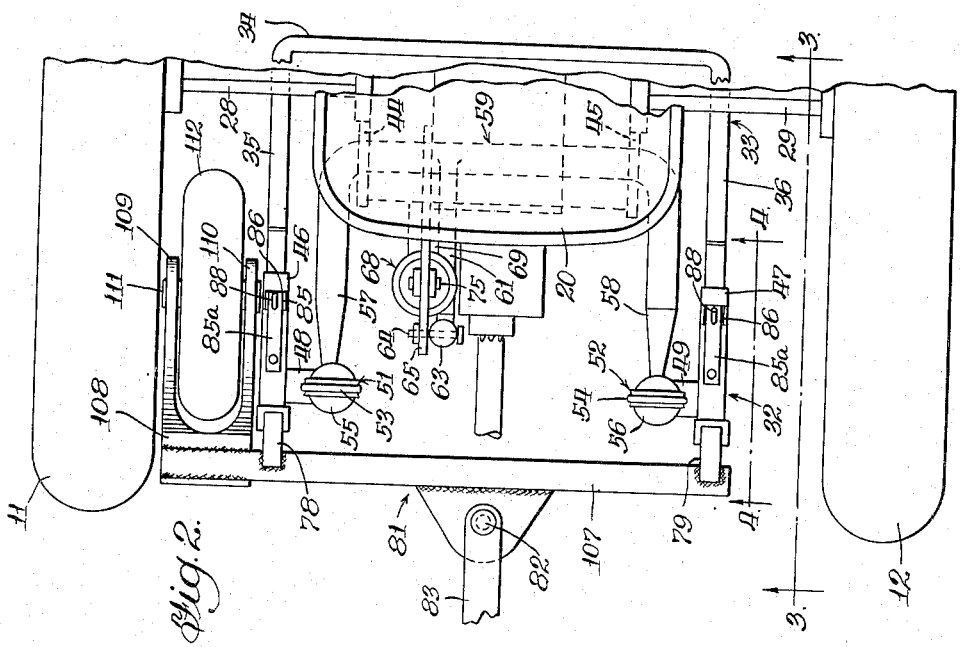
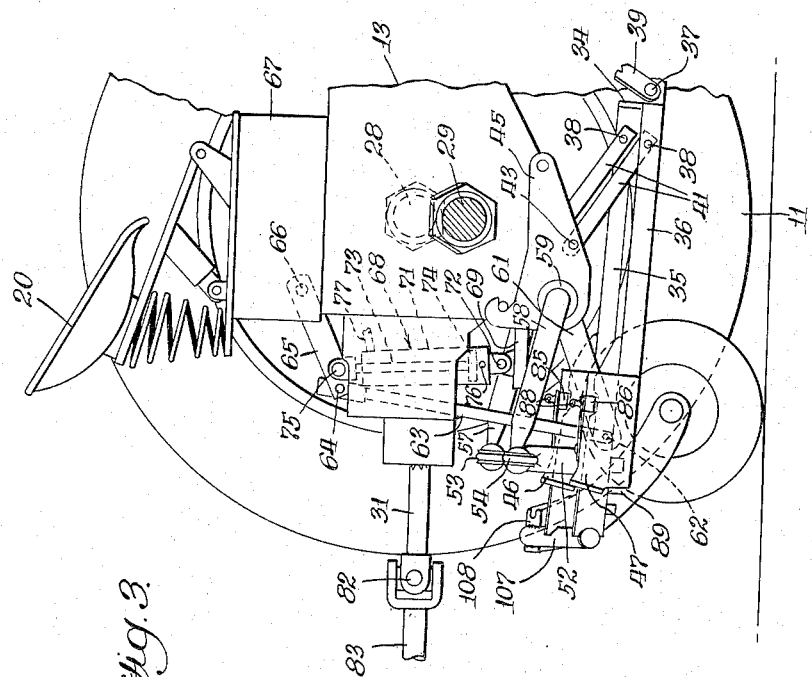
INVENTOR.
Arnold E. W. Johnson
BY Paul O. Pippel
Atty.

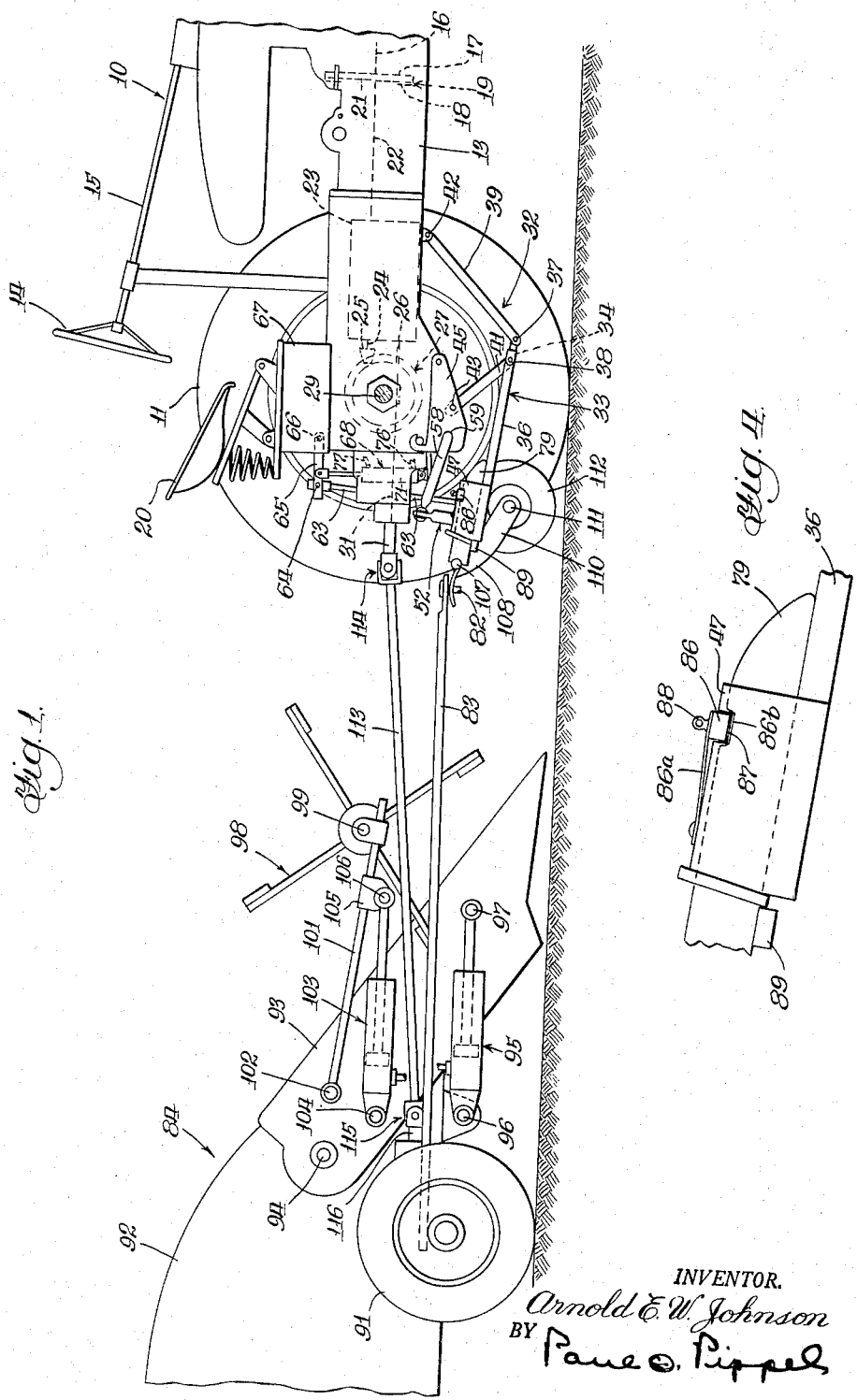

_United States Patent Office_

2,761,268
Patented Sept. 4, 1956

2,761,268

HARVESTER TOWING TRACTOR HAVING POWER-OPERATED TRACTION WHEEL LIFTING PROP

Arnold E. W. Johnson, Oak Park, Ill., assignor to International Harvester Company, a corporation of New Jersey Application March 10, 1954, Serial No. 415,337

5 Claims. (Cl. 56—10)

This invention has to do with power take-off control for farm type tractors of the character in which a traction wheel of the tractor is elevated by a vehicular prop from traction engagement with the ground to interrupt vehicular travel of the tractor while providing for continued operation of the power take-off shaft, and more particularly concerns such a prop which is selectively projected and retracted with respect to the ground by power means for controlling the elevation of a hitch or coupling structure which is vertically movable to facilitate registration thereof with a complemental coupling structure of an implement to be coupled to the tractor.

There is now being produced a form of quick attachable hitch means for use between farm tractors and implements to be mounted thereon or towed thereby. This quick attaching means comprises a vertically adjustable coupling structure upon the tractor and a complemental coupling structure upon the implement. Power means is provided on the tractor for vertically adjusting the coupling structure thereon to cause registration thereof with the coupling structure of the implement so that vehicular movement of the tractor, usually in a backward direction, will move the tractor-mounted coupling structure into a telescopic latching relation with the implement-mounted coupling structure. Means are provided for unlatching the telescoped coupling structures when it is desired to release the hitch between the tractor and implement attendant to driving the tractor away from the implement. Many of these tractors are also provided with a type of power take-off shaft which, like the traction wheels of the tractor, is driven through the main clutch of the vehicle. As a consequence when the main clutch is disengaged for stopping vehicular movement of the tractor the power take-off shaft ceases rotation.

Some types of implements, for example, combined harvesters and threshers and ensilage harvesters include crop processing mechanism which is driven from the tractor power take-off shaft while the tractor and implement traverse the field of the crop being harvested. Occasionally the crop is so abundant in portions of the field that it is delivered into the crop processing mechanism of the machine at a rate exceeding its processing capacity whereupon it becomes desirable to stop vehicular movement of the tractor and machine and to drive the crop processing mechanism while the tractor and machine are at rest until the excess crop within the processing mechanism has been processed to clear the machine. This maneuver has been cumbersome with the above described type of power take-off shaft since this shaft and the processing mechanism comes to rest when the main clutch of the tractor is disengaged for stopping the tractor and machine. To again start the crop processing mechanism while leaving the tractor and machine at rest it has been necessary to shift the change-speed transmission of the tractor into neutral before re-engaging the clutch. After the crop processing mechanism of the machine has been cleared it has been necessary to again disengage the clutch preparatory to reconnecting a desired gear train of the change-speed transmission and thereafter reengaging the clutch for resuming normal operation.

The principal object of this invention is the provision in association with one of the cooperative implement coupling structures of a vehicular prop moved vertically with these coupling structures by power received from the means for vertically adjusting the coupling structures and disposed nearer to one of the tractor traction wheels than the other so that when this vehicular prop is projected downwardly against the ground it is capable of lifting such tractor wheel from the ground and thereby immediately interrupt vehicular travel of the tractor and machine while the power take-off shaft and crop processing mechanism of the machine continue to operate. After the machine is cleared of excess crop material the power means for vertically adjusting the coupling structures is operated to lift the structures together with the vehicular prop attendant to which the raised traction wheel is allowed to again rest upon the ground to resume normal vehicular travel and function of the machine.

A further object is the provision upon a machine including crop harvesting mechanism drivable from the power take-off shaft of a tractor and also including coupling structure cooperable with a power driven vertically adjustable coupling structure upon the tractor, of a vehicular prop mounted upon the machine adjacent the coupling structure and adapted to be projected downwardly into pressing relation with the ground for lifting one of the tractor traction wheels when the machine is coupled into the tractor.

The above and other desirable objects inherent in and encompassed by the invention are elucidated in the ensuing description, the appended claims and the annexed drawings, wherein:

Fig. 1 is a side elevational view fragmentarily showing the rear portion of a farm tractor having the nearest traction wheel removed and fragmentarily showing the forward portion of a partly diagrammatically illustrated combined harvester thresher machine coupled to the tractor by power-driven vertically adjustable coupling structure, together with a vehicular prop attached to a component of the coupling structure for lifting one of the tractor traction wheels from contact with the ground when the coupling structure and vehicular prop are forced downwardly to press the prop against the ground.

Fig. 2 is a fragmentary plan view of enlarged scale showing the rear portion of the tractor, the power driven hitch or coupling structure and the vehicular prop mounted upon said structure.

Fig. 3 is a enlarged scale vertical sectional view taken at the line 3—3 of Fig. 2, illustrating the operative position wherein the coupling structure and the vehicular prop have been power moved downwardly to elevate one of the tractor wheels.

Fig. 4 is an enlarged fragmentary view taken at the line 4—4 in Fig. 2, illustrating details of latchable components of the telescopic coupling structure.

With continued reference to the drawings there is shown the rear end portion of a wheel type farm tractor 10 having the usual rear traction wheels 11 and 12, Fig. 2, at opposite lateral sides of a fore and aft extending body 13. The traction wheel 12 has been omitted from Figs. 1 and 3 for exposing parts of the apparatus associated with the tractor. A steering wheel 14 and steering column 15 therefor are for controlling steering movement of any form of dirigible wheels (not shown) for supporting the front end of the tractor. An operator's seat is designated 20. A tractor engine crankshaft 16 shown diagrammatically by a dotted line in Fig. 1 drives a flywheel 17 coaxial therewith and with which there is associated a driving element 18 of a main clutch 19. A driven disc element 21 of the clutch 19 drives a clutch driven shaft 22 which drives a change-speed gearing unit 23 having a tail shaft 24 upon which there is mounted a beveled pinion 25 for driving a beveled ring gear 26 of a differential unit 27. The unit 27 differentially drives axle shafts 28 and 29, Fig. 2, upon which the traction wheels 11 and 12 are respectively mounted. Also driven from the transmission 23 and hence from the main clutch 19 is a power take-off shaft 31.

Beneath the rear portion of the tractor body there is mounted an implement hitch or coupling structure 32 comprising a drawbar bail 33 having a bight 34 and rearwardly extending legs 35 and 36; see Figs. 2 and 3. The bail bight 34 is pivotally supported by pins 37 and 38 respectively at the lower ends of downwardly converging links 39 and 41. The link 39 is pivotally attached by a pin 42 to the lower side of the tractor body whereas each of two links 41 (both being shown in Fig. 3 is supported by a pivot pin 43 in respective bracket plates 44 and 45 mounted upon respective rear lower sides of the tractor body. Articulation afforded by pivot pins 37, 38, 42 and 43 facilitate the U-shaped drawbar 33 swinging to adjust the vertical position of the rear ends of the legs 35 and 36 thereof attendant to slight swinging of the links 39 and 41 about the pivot pins 42 and 43.

Rear end portions of the drawbar bail legs 35 and 36 have coupling structure sockets 46 and 47 thereon. Brackets 48 and 49 respectively on the sockets 46 and 47 are pivotally connected with the lower ends of vertical links 51 and 52. The upper ends of these links 51 and 52 are formed with ring-like bearings 53 and 54 having semispherical inner peripheries journalled upon spherical bearings 55 and 56 upon the rear ends of rockshaft arms 57 and 58 of a rockshaft 59 extending through and journalled in the bracket plates 44 and 45. An operating arm 61 for the rockshaft 59 is rigidly associated therewith as shown by dotted lines in Fig. 2 and extends rearwardly where it is connected by a pivot pin 62, Fig. 3, with the lower end of a long vertical link 63 pivotally connected by a pin 64 at its upper end with the rear end of a link 65 pivoted at 66 to a seat supporting mount 67.

A hydraulic ram 68 is connected between the link 65 and a perch 69 secured to the back end of the tractor body 13. A cylinder 71 of the ram is pivotally connected at its lower end by a pin 72 to the perch 69. A piston rod 73 for a piston 74 in the cylinder 71 has its upper end pivotally connected by a pin 75 with the link 65. The ram 68 is expanded for forcing the link 65 to swing upwardly about the pivot 66 when fluid under pressure is introduced into the lower end of the cylinder through a conduit 76 while fluid is allowed to exhaust from the upper end of the cylinder through a conduit 77. The link 65 can be forced to swing downwardly about the pivot 66 by the introduction of fluid under pressure inwardly of the cylinder through the conduit 77 while exhausting fluid from the lower end of the cylinder through the conduit 76.

Vertical swinging of the link 65 is effective through the vertical link 63 and the arm 61 for swinging the rockshaft 59 and thereby causing correlated vertical swinging of the drawbar legs 35 and 36 to selectively determine the vertical position of the sockets 46 and 47 constituting coupling structure elements. In this manner the coupling sockets 46 and 47 of coupling structure 32 can be caused to register vertically with bayonet type coupling structure elements 78 and 79 of a second coupling structure 81 pivotally mounted by a pin 82 on the front end of a tongue 83 of a trail-behind implement in the form of a combined harvester threshing machine 84. The lateral spacing of the sockets 46 and 47 is equal to that of the bayonet element 78 and 79 so that while the machine 84 is uncoupled from the tractor, and the coupling structure 81 and the front end of the tongue 83 are supported above the ground by a wheel 112 mounted on such coupling structure, the socket elements 46 and 47 can be adjusted by the hydraulic ram 68 (power operated means) to be the same elevation as the bayonet elements 78 and 79 enabling the telescopic entry of the elements 78 and 79 into the elements 46 and 47 incident to backing of the tractor. Thus the coupling structures 32 and 81 are coupling components of a coupling mechanism formed thereby. Latch members 85 and 86 are urged by springs 85a to drop into notches 86b in the socket elements 46, 47 and therefore to drop into recesses 87, Fig. 4, of the bayonet elements 78 and 79 to latch these bayonet elements in the socket elements and maintain the coupling relation thereof. Uncoupling of these coupling elements is possible when the latch members 86 are manually lifted from the recesses 87. Manual engagement of the latches 84 is facilitated by apertured ears 88 thereof.

The distance the bayonet elements 78 and 79 can move into the socket elements 46, 47 is limited by bayonet element lugs 89 abutting against the rear ends of the socket elements.

The crop harvesting machine 84 is supported upon wheels 91 and includes crop harvesting or processing mechanism within a housing 92 and a crop cutting and elevating means 93 pivoted to the housing 92 at 94. The processing mechanism may be of the character shown in U. S. Patent No. 2,312,838, or may be any other form of field crop processing mechanism. A hydraulic ram 95 pivotally connected to the housing 92 at 96 and pivotally connected to the crop cutting and elevating means at 97 is expandable or contractible to change the pivoted position of such crop cutting and elevating means about the pivot 94 and consequently selectively determine the height above the ground at which the crop is cut. A reel 98 is driven and supported by a shaft 99 carried on a rod 101 pivoted to the crop cutting and elevating means at 102. A hydraulic ram 103 is pivotally connected to the crop cutting and elevating means at 104 and to a bracket 105 on the rod 101 at 106, the ram serving as a strut variable in length for swinging the rod 101 about the pivot 102 for changing the elevation of the reel 98.

A crossbar 107 of the coupling structure 81 has a bifurcated bracket 108 mounted upon one end thereof adjacent to the traction wheel 11. Furcations 109 and 110 of the bracket 108 support an axle 111 for a wheel 112. This bracket 108 and the parts mounted thereon constitute a vehicular prop which is adapted to raise the left traction wheel 11 of the tractor when this prop is forced downwardly against the ground by expansion of the hydraulic ram 68 as illustrated in Fig. 3. Such raising of the traction wheel allows it to spin incident to terminating vehicular travel of the tractor and crop harvesting machine 84. Meanwhile means in the form of a shaft 113 driven from the power take-off shaft 31 continues to drive the crop processing mechanism (not shown) within the machine housing 92. A universal joint 114 connects the shaft 113 with the power take-off shaft 31 and a second universal joint 115 connects the rear end of the shaft 113 with a driving shaft 116 for the crop processing mechanism.

When the crop harvesting equipment traverses a localized area in a field where the crop is inordinately abundant to exceed the capacity of the machine for its rate of travel, causing the machine to become "choked-up," it is only necessary for the operator to cause energization of the hydraulic ram 68 for contacting the same. This pivots the link 65, Fig. 1, counterclockwise which forces the vehicular link 63 and the rear end of the rockshaft operating arm 61 downwardly for pivoting the rockshaft 59 counterclockwise from the position shown in Fig. 1 to a position such as that shown in Fig. 3. Thus the rockshaft arms 57 and 58 are operable through the brackets 48 and 49 for forcing the coupling structure sockets 46 and 47 downwardly together with the complemental coupling structure 81. This of course forces the vehicular prop including the wheel 112 downwardly into contact with the ground for raising the traction wheel 11. When the crop harvesting machine is no longer advanced no more crop will be fed into the crop processing mechanism thereof wherefore the power drive for this mechanism from the tractor power take-off shaft 31 will continue the operation thereof for clearing it of the excess crop. As soon as the machine is cleared the operator can cause power expansion of the ram 68 to re-contract the vehicular prop including the wheel 112, thus allowing the traction wheel 11 to re-engage the ground and resume normal operation of the equipment.

Having thus described a single preferred form of the invention with the view of clearly and concisely illustrating the same, I claim:

1. In crop harvesting equipment, a tractor including traction wheels at opposite lateral sides thereof, a power take-off shaft, a vertically adjustable implement coupling structure, and power means for selectively changing the elevation of said coupling structure; a crop harvesting machine including a second coupling structure attachable to the vertically adjustable structure of the tractor, crop processing mechanism, and means drivable from the power take-off shaft of the tractor for operating the crop processing mechanism of the machine; and traction interrupting means for the tractor comprising a vehicular prop mounted on the coupling structure of said machine and disposed adjacent one of the tractor traction wheels, said vehicular prop being projectable against the ground attendant to lowering of the second coupling structure with the vertically adjustable structure for lifting said traction wheel and stopping forward progress of the tractor and machine while the power take-off shaft continues to operate the crop processing means of the machine.

2. In crop harvesting equipment, a tractor including traction wheels at opposite lateral sides thereof, a power take-off shaft, a vertically adjustable implement coupling structure, and power means for selectively changing the elevation of said coupling structure; a crop harvesting machine including a second coupling structure attachable to the vertically adjustable structure of the tractor, crop processing mechanism, and means drivable from the power take-off shaft of the tractor for operating the crop processing mechanism of the machine; and traction interrupting means for the tractor comprising a vehicular prop disposed adjacent one of the tractor traction wheels and connected with one of the coupling structures to be projected downwardly against the ground attendant to lowering of said structures by the power means, and the downwardly projected prop being thus operable for lifting said traction wheel and stopping forward progress of the tractor and machine while the power take-off shaft continues to operate the crop processing means of the machine.

3. In crop harvesting equipment, a tractor including traction wheels at opposite lateral sides thereof, a power take-off shaft, a vertically adjustable implement coupling structure comprising coupling components respectively adjacent the traction wheels, and power means for selectively changing the elevation of said coupling structure; a crop harvesting machine including a second coupling structure with laterally spaced components respectively attachable to components of the vertically adjustable structure of the tractor, crop processing mechanism, and means drivable from the power take-off shaft of the tractor for operating the crop processing mechanism of the machine; and traction interrupting means for the tractor comprising a vehicular prop mounted on one of the coupling structures adjacent one of the components thereof for disposition adjacent one of the traction wheels and for projection downwardly against the ground attendant to lowering of said coupling component by said power means, and the downwardly projected prop being thus operable for lifting said traction wheel and stopping forward progress of the tractor and machine while the power take-off shaft continues to operate the crop processing mechanism of the machine.

4. The combination set forth in claim 3 wherein said prop is mounted on the coupling structure of the implement adjacent one of the coupling components of said structure.

5. In a crop harvesting machine towable behind a tractor having a power take-off shaft and laterally spaced coupling components respectively adjacent traction wheels of the tractor and changeable in elevation by power operated means; a crop processing mechanism drivable from the power take-off shaft of the tractor, a coupling structure extending transversely of said machine and including coupling components spaced apart a distance for simultaneous registration thereof with the coupling components of the tractor, and a vehicular prop mounted upon said coupling structure adjacent one of the coupling components thereof.

References Cited in the file of this patent
UNITED STATES PATENTS

| | | |
|---|---|---|
| 1,464,740 | Benjamin et al. | Aug. 14, 1923 |
| 2,250,964 | Poor et al. | July 29, 1941 |
| 2,681,709 | Miller | June 22, 1954 |